United States Patent [19]

Beatty, III et al.

[11] Patent Number: 5,751,595

[45] Date of Patent: May 12, 1998

[54] METHOD FOR BUILDING AND VERIFYING AUTHENTICITY OF A RULE SYSTEM

[75] Inventors: Harry John Beatty, III, Clinton Corners; Peter Claude Elmendorf, Poughkeepsie, both of N.Y.; Jeannie Harrigan Panner, Underhill, Vt.; Bijan Salimi; Lansing Dunn Pickup, both of Colchester, Vt.

[73] Assignee: International Business Machines Corporation, Armonk, N.Y.

[21] Appl. No.: 616,171

[22] Filed: Mar. 14, 1996

[51] Int. Cl.[6] .................................................. G06F 15/00
[52] U.S. Cl. ..................... 364/490; 395/500; 395/187.01; 380/4; 380/21; 380/22; 380/23
[58] Field of Search .................................. 364/488–491; 395/326, 2.22, 21–23, 51, 54; 361/820; 380/4, 21, 23, 20–24, 28, 30, 43–45

[56] References Cited

U.S. PATENT DOCUMENTS

| 4,766,516 | 8/1988 | Ozdemir et al. ........................ 361/820 |
| 4,920,499 | 4/1990 | Skeirik ....................................... 395/12 |
| 4,944,008 | 7/1990 | Piosenka et al. ......................... 380/46 |
| 5,091,942 | 2/1992 | Dent et al. ................................ 380/46 |
| 5,121,496 | 6/1992 | Harper ..................................... 707/200 |

(List continued on next page.)

FOREIGN PATENT DOCUMENTS

| 525258 | 2/1993 | European Pat. Off. . |
| 2-072441 | 3/1990 | Japan . |

OTHER PUBLICATIONS

"Systems Architecture for Compile—Time Authorization/Integrity," *IBM Technical Disclosure Bulletin*, vol. 19, No. 12, May 1977, pp. 4474–4476.

"Authorization Rules Definition and Validation in a Multi-level Database Architecture," *IBM Technical Disclosure Bulletin*, vol. 22, No. 12, May 1980, pp. 5446–5449.

"IBM 9370 Configurator Knowledge Base Upgrade Rules," *IBM Technical Disclosure Bulletin*, vol. 32, No. 1, June 1989, pp. 244–245.

"Low–Voltage Eletrography Using Monocomponent Development," *IBM Technical Disclosure Bulletin*, vol. 33, No. 1A, Jun. 1990, pp. 114–116.

"Design of a Composite Production Rule Syntax and Associated Logical Data Structure," *IBM Technical Disclosure Bulletin*, vol. 33, No. 7, Dec. 1990, pp. 109–116.

"User–Directed Rules Checking," *IBM Technical Disclosure Bulletin*, vol. 36, No, 6A, Jun. 1993, pp. 365–373.

"The ES/AG: System Generation—Its Development and Use in Expert System Applications," *IEEE Comput Soc. Press*, 1985 (abstract only) (Dec.).

"ES/AG: System Generation Environment for Intelligent Application Software," *IEEE Comput. Soc. Press*, 1985 (abstract only) Dec.

Primary Examiner—Kevin J. Teska
Assistant Examiner—Vuthe Siek
Attorney, Agent, or Firm—Jenkens & Gilchrist; Michael J. Balconi-Lamica; Alison D. Mortinger

[57] ABSTRACT

A method for verifying that an integrated circuit design tool kit has not been modified in an unauthorized manner is accomplished by providing a verification procedure that, when an executable subrule of the tool kit has been selected to be part of the rule system, the executable subrule reads a table of time stamps. This table of time stamps and a key are provided, as representative data, to an authentication subrule by the executable subrule. The executable subrule and the authentication subrule perform an authentication check algorithm upon the representative data to produce remotely and locally checked data respectively. The executable subrule then provides the locally checked data to the authentication subrule which compares the locally checked data with the remotely checked data. When a match occurs between the data, the authentication subrule indicates that the executable subrule has not been modified in an unauthorized manner. When the locally checked data does not match the remotely checked data, the authentication subrule indicates that an unauthorized modification has occurred.

15 Claims, 6 Drawing Sheets

U.S. PATENT DOCUMENTS

| | | | |
|---|---|---|---|
| 5,153,919 | 10/1992 | Reed, III et al. | 380/44 |
| 5,157,727 | 10/1992 | Merkle et al. | 395/2.22 |
| 5,189,700 | 2/1993 | Blanford | 380/23 |
| 5,293,629 | 3/1994 | Conley et al. | 395/708 |
| 5,301,270 | 4/1994 | Steinberg et al. | 395/326 |
| 5,313,616 | 5/1994 | Cline et al. | 395/500 |
| 5,339,435 | 8/1994 | Lubkin et al. | 395/712 |
| 5,355,474 | 10/1994 | Thuraisngham et al. | 707/9 |
| 5,375,169 | 12/1994 | Seheidt et al. | 380/21 |
| 5,386,557 | 1/1995 | Boykin et al. | 707/1 |
| 5,404,502 | 4/1995 | Warner et al. | 395/182.18 |
| 5,481,720 | 1/1996 | Loucks et al. | 395/187.01 |
| 5,504,892 | 4/1996 | Atsatt et al. | 707/103 |
| 5,509,073 | 4/1996 | Monnin | 380/20 |
| 5,533,123 | 7/1996 | Force et al. | 380/4 |
| 5,537,474 | 7/1996 | Brown et al. | 380/23 |
| 5,633,932 | 5/1997 | Davis et al. | 380/25 |

METHOD FOR BUILDING AND VERIFYING AUTHENTICITY OF A RULE SYSTEM

TECHNICAL FIELD OF THE INVENTION

This invention relates generally to integrated circuit (IC) design tool kits and more particularly to a verification algorithm which detects when an IC design tool kit was modified without authorization.

BACKGROUND OF THE INVENTION

With the continued improvement of integrated circuits (IC), the world of electronics and, for that matter, the world has dramatically changed. ICs have allowed engineers to design portable and affordable goods for the general public and for industry. For example, engineers have been able to design computers, micro-size radios, and mini-screen television sets using ICs.

In the early days of integrated circuit fabrication, the IC manufacturer specified the IC chip design and its operating criteria with little, if any, input from an IC user, i.e., one who uses an IC in a design. As such, the IC user, which may be an engineer, would have to design products based on the specifications of the integrated circuit. In many cases, the IC user would have to create interfacing, or coupling, circuits to benefit from the use of an integrated circuit. In more recent times, however, IC manufacturers have solicited input from IC designers, i.e., one who designs integrated circuits, and from IC users to increase user-friendly use of such integrated circuits and to allow IC designers to customize their own integrated circuit.

To enable an IC designer to customize its own IC, the IC manufacturer, or supplier, provides the IC designer with design tools. Such design tools, or technology tool kits, include computer program instructions that define available circuits, complex circuitry, and a set of execution instructions. The program instructions for the circuits or complex circuitry define the operational parameters for the circuits. For example, if the circuit is an AND gate, the corresponding program instructions may include the boolean function of the AND gate, rise and fall times of the inputs, rise and fall times of the output, propagation delays from input to output, and/or current drain. The set of execution instructions provide descriptions of circuitry interconnections, i.e., define legal interconnections of the circuits or complex circuitry.

One such tool kit uses static timing. In a static timing tool kit, the programming instructions are concerned with propagation and transition times of a newly designed circuit. Such static timing tool kits are not concerned with the particular boolean functions being executed by the circuit; such testing is left to tool kits which test the boolean function.

Because suppliers are encouraging IC designers to develop their own custom ICs, the tool kits are usually delivered in source code (human readable form). Sometimes an IC designer may change the tool kit, either purposefully or accidentally. When such a change occurs, the supplier may not be aware of such a change when the IC is fabricated. If an IC is fabricated with an unauthorized change to the tool kit, the resulting integrated circuit may not perform as desired, thus wasting time and money for both the IC manufacturer and IC designer.

Therefore, a need exists for a method that indicates when an IC design tool kit has been modified, whether the modification was accidental or purposeful.

DETAILED DESCRIPTION OF A PREFERRED EMBODIMENT

Generally, the present invention provides a method for verifying that an integrated circuit design tool kit has not been modified in an unauthorized manner. To accomplish this, the present invention provides a verification procedure that, when an executable subrule of the tool kit has been selected to be part of the rule system, the executable subrule reads a table of time stamps. This table of time stamps and a key are provided, as representative data, to an authentication subrule by the executable subrule. The executable subrule and the authentication subrule perform an authentication check algorithm upon the representative data to produce remotely and locally checked data, respectively. The executable subrule then provides the locally checked data to the authentication subrule which compares the locally checked data with the remotely checked data. When a match occurs between the data, the authentication subrule indicates that the executable subrule has not been modified in an unauthorized manner. When the locally checked data does not match the remotely checked data, the authentication subrule indicates that an unauthorized modification has occurred. By flagging unauthorized modifications, the IC manufacturer, or supplier, can identify when a tool kit has been modified without its knowledge, thus allowing the supplier to verify that the change is a valid change or to suspend manufacturing of an integrated circuit designed by an invalid rule system.

Figure 1:
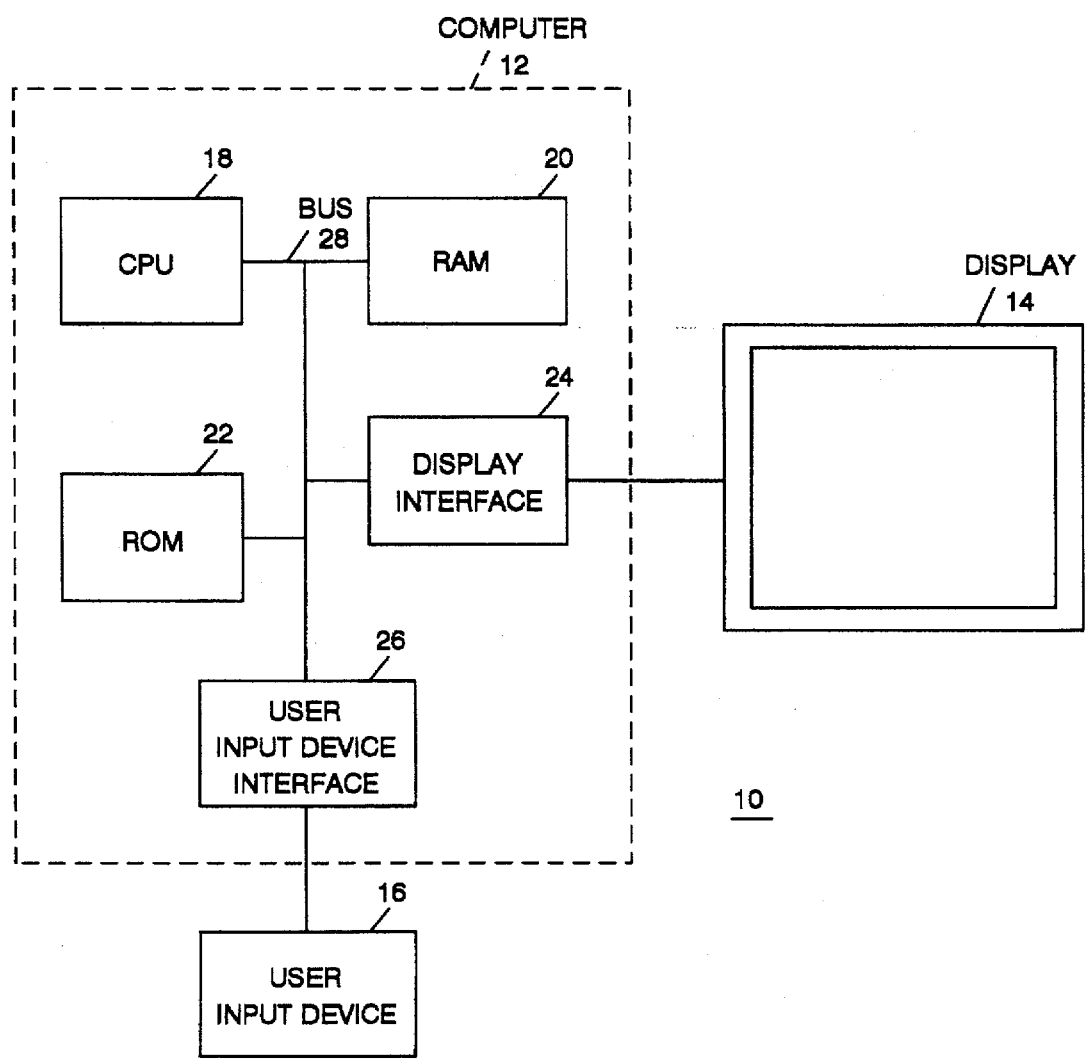
FIG. 1 illustrates a schematic block diagram of a computer that may incorporate, or perform, the present invention.

FIG. 1 illustrates a block diagram of a computer system 10 that may be used to implement the present invention. As shown, the computer system 10 includes a computer 12, a display 14, and a user input device 16. The display 14 may be any CRT display or flat screen display which are commonly used within the art. The user input device 16 may be a keyboard, mouse, joystick, touch screen, or any other means in which a user can enter data into the computer 12.

As shown, the computer 12 includes a central processing unit 18, random access memory 20, read only memory 22, a display interface 24, and a user input device interface 26 which are all coupled together by a bus 28. The general architecture of a computer is well known in the art; thus, no further description of the computer system 10 will be presented except to further illustrate the concepts of the present invention.

Figure 2:
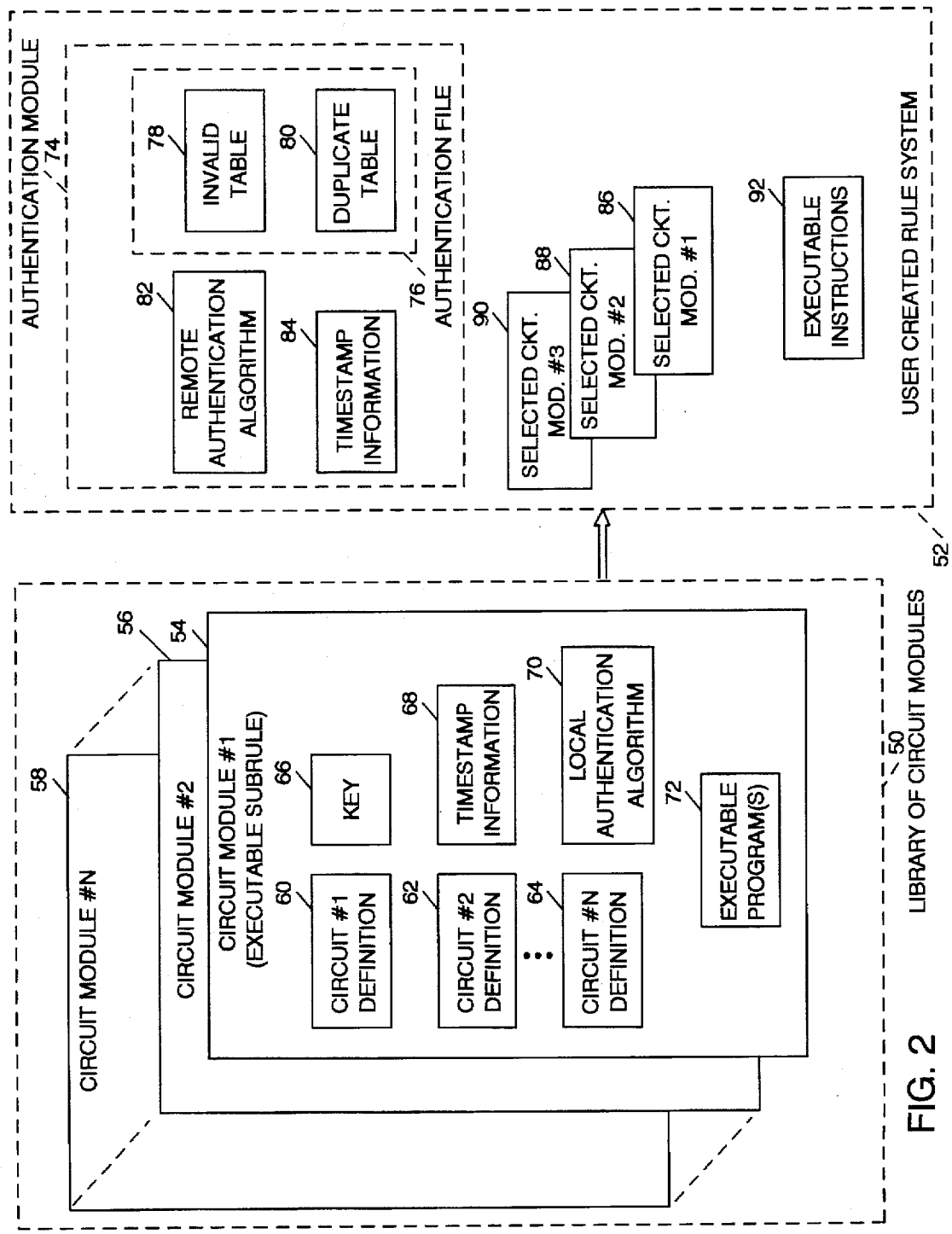
FIG. 2 illustrates a representative process of a user-created rule system from a library of circuit models in accordance with the present invention.

FIG. 2 illustrates a graphical representation of a user-created rule system 52 from a library of circuit modules 50. The library of circuit modules 50 includes a plurality of circuit modules 54, 56, 58. Each of the circuit modules, or executable subrules, includes a plurality of circuit definitions 60, 62, 64, a key 66, time stamp information 68, a local authentication algorithm 70, and executable programs 72. The circuit definitions 60, 62, 64 include definitions of particular circuits which are representative of the circuit module. For example, the circuit module may be an address generation unit that includes a modulo addressing scheme wherein a particular circuit definition includes a modulo counter while another circuit may include a comparator, and the other circuitry of the address generation unit. Such program instructions for the circuit definitions may be provided in source code.

The key 66 and the local authentication algorithm 70 are provided to the IC designer in object code (machine readable form). The time stamp information 68 comprises a table of the time stamps for each circuit definition 60, 62, 64 and the executable program 72, which is also supplied to the IC designer in object code. When the IC supplier, or manufacturer, changes any of the circuit definitions, or executable programs, the corresponding time stamp entry in the time stamp information 68 is updated. If the IC designer changes any of the circuit definitions, or executable programs, the time stamp information 68 is not changed, but time stamp information produced by a compiler is updated. The time stamp information produced by the compiler will be discussed in greater detail with reference to FIG. 3 and the runtime timestamp information 100.

The local authentication algorithm is used by a circuit module, once it has been selected, to verify that it is communicating with an authentication module and also to generate a modified key such that the IC designer cannot bypass the verification process of the present invention.

To create the user-created rule system 52, which represents a particular integrated circuit design generated by an IC designer, the IC designer selects particular circuit modules from the library of circuit modules 50. These selected circuit modules are shown as selected circuit modules #1 86, #2 88, and #3 90, which correspond to the circuit modules #1 54, #2 56, and #3 of the library of circuit modules 50. In addition, the IC designer may select executable programs 92 from the executable programs 72 which define how the selected circuit modules will be connected and other operational instructions, or functional performance requirements of the user designed integrated circuit.

The user-created rule system 52 also includes an authentication module which is automatically provided by the supplier to be included within any user-created rule system 52. The authentication module 74 includes a remote authentication algorithm 82, time stamp information 84, an authentication file 76 which is derived from an invalid table 78 and a duplicate table 80. The remote authentication algorithm 82 may be encrypted and stored as object code. In fact, all the information within the authentication module 74 may be delivered to the IC designer in object code form. The intent of this is to make it difficult, if not impossible, for the IC designer to modify the verification process. In many situations, the IC designer may be encouraged to alter the circuit definitions 60, 62, 64 to achieve their desired performance. When such a change is made, it is flagged to the supplier, which then has the opportunity to verify that such changes will actually work as the IC designer has desired. If the supplier verifies that the IC designer changes are valid, the IC manufacturer, or supplier, can include the IC designer changes in the circuit modules and can also proceed in fabrication of the integrated circuit with confidence.

Figure 3:
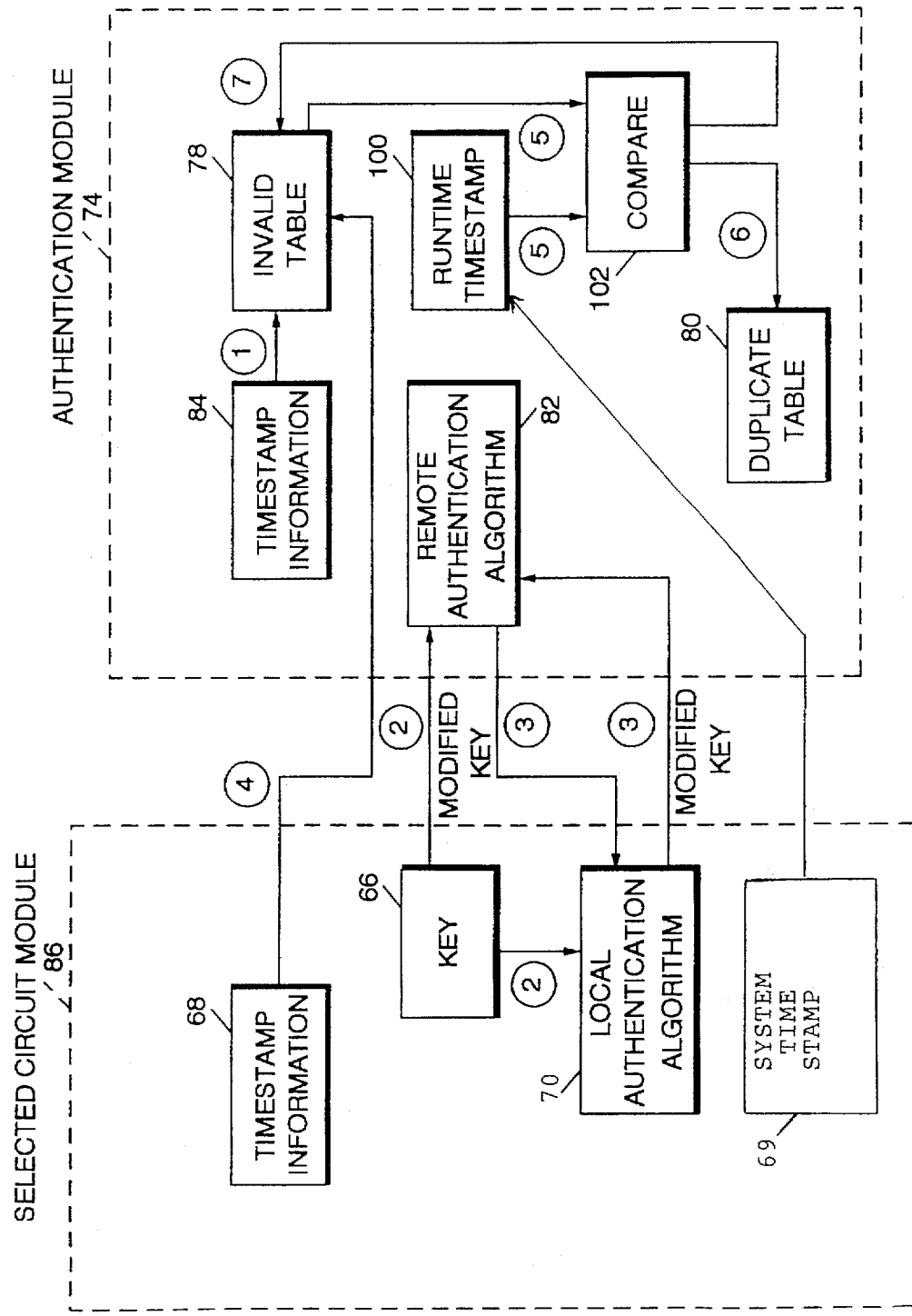
FIG. 3 illustrates the data exchange between a selected circuit module and an authentication module in accordance with the present invention.

FIG. 3 illustrates the flow of information during the authentication process. This typically occurs after a rule system has been loaded and initialized but before the application has regained control. For this particular figure, the application is a static timer application such as EinsTimer and serves two purposes. First, it is the application that uses this rule system and therefore is the application in control when it is loaded. Secondly, it is the application requesting the verification report. The application need not have to do this but if implemented in this manner, the verification report can be produced on demand. Thus, the application's, or IC design tool kit's, only role in the verification process is to load the rules and request the verification.

Upon request of the authentication process and subsequent verification report, the authentication module places its time stamp information 84 into the invalid table 78. The time stamp information 84 stored in the authentication module 74 can be obtained in a couple of ways. For example, the information regarding all of the time stamps of the circuit modules may be loaded into the authentication module 74, and when particular circuit modules are selected, their corresponding time stamps are flagged within the time stamp information module 84. Alternatively, this information may be obtained from the circuit modules as they are selected. In any case, the time stamps are supplied to the invalid table 78. This is represented by numeral 1 as the first step in the verification process.

Next, a key 66 from the selected module 86 is provided to the remote authentication algorithm 82 of the authentication module 74 and to the local authentication algorithm 70 of the selected circuit module 86. At this time, both the local authentication algorithm 70 and the remote authentication algorithm 82 perform an algorithm upon the key 66. Such an algorithm may be a simple decryption algorithm, an encryption algorithm, or any other type of algorithm to modify the key. Once the key has been modified by the remote authentication algorithm 82, it provides a modified key and a verification key to the local authentication algorithm 70. The local authentication algorithm 70 determines whether the modified key it generated matches the modified key generated by the remote authentication algorithm 82. If the local authentication algorithm 70 determines that the modified keys do not match, it indicates that it is not dealing with an authentication module.

If the locally generated modified key matches the remotely generated modified key, the local authentication algorithm 70 modifies the verification key and sends it to the remote authentication algorithm 82. The remote authentication algorithm 82 determines whether the modified verification key matches a modified verification key it generated. If the modified verification keys do not match, the remote authentication algorithm indicates that the key has been tampered with, thereby indicating that the selected circuit module has been altered in an unauthorized manner.

Once the selected circuit module 86 knows it is dealing with an authentic authentication module 74, it provides its time stamp information 68 to the invalid table 78. Note that, to prevent the addition of subrules that attempt to circumvent the security of the present invention, the checking-in of each module and time stamp table by the selected circuit module 86 requires that the key and modified verification key be provided to the authentication module 74. Thus, the authentication module 74 can determine whether the selected circuit module 86 has been modified or added in an unauthorized manner to the rule system.

When the rule system is being executed, each circuit definition or execution program is invoked causing its corresponding time stamp to be transferred from the system time stamp 69 to a run time memory module 100, which may be stored within the authentication module or any other place accessible to the authentication module. The system time stamp 69 stores a time stamp for each circuit definition, or execution program, when it was compiled. Thus, if the IC designer modifies a circuit definition, or executable program, the corresponding time stamp will reflect the change. At the completion of the execution of the rule system, the run time memory module 100 will include a list of all time stamps accessed during the run time of the rule system. This information is then compared with the information stored in the invalid table 78 by a comparator 102.

If the comparator 102 indicates that there is a corresponding time stamp in the run time memory module 100 with an entry in the invalid table 78, data flow follows path number 7 and deletes that entry within the invalid table 78. If, however, a corresponding entry in the run time memory module 100 is not found in the invalid table 78, that particular time stamp is entered in the duplicate table 80. At the exhaustion of entries in the run time memory module 100, the invalid table 78 and the duplicate table 80 are checked. If both tables are empty, the authentication module determines that the selected circuit modules of the rule system have not been modified in an unauthorized manner. If, however, either the invalid table or the duplicate table 80 has an entry, the authentication module indicates that an unauthorized modification of one of the selected modules has occurred.

Figure 4:
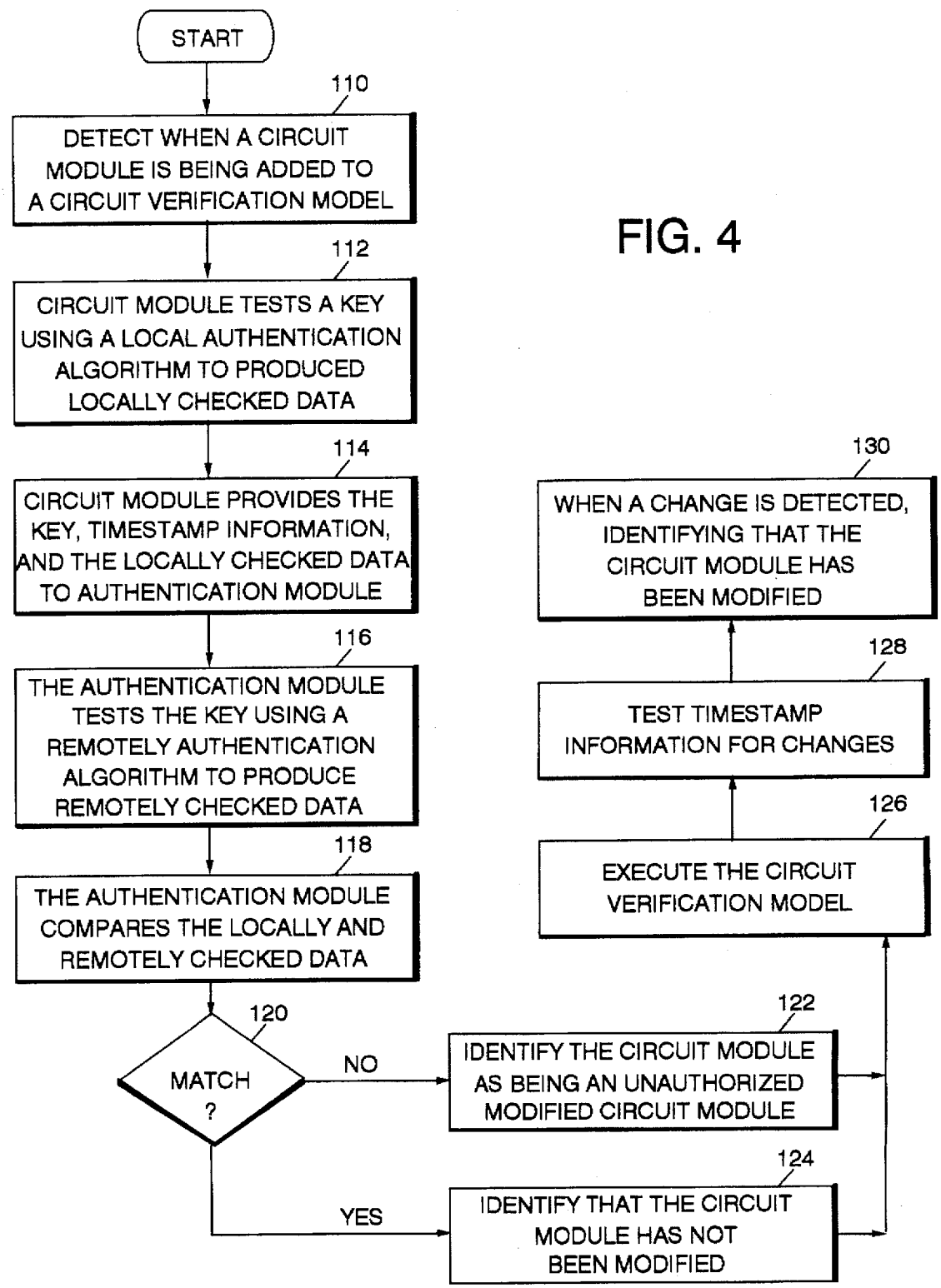
FIG. 4 illustrates a logic diagram that may be used to implement a method in accordance with the present invention.

FIG. 4 illustrates a logic diagram that may be used to implement a method in accordance with the present invention. Program instructions to implement this method may be stored on any computer readable storage medium such as a computer disk, RAM, ROM, magnetic tape, CD ROM, or any other means for storing digital information. The process begins at step 110, wherein a determination is made as to when a circuit module is being added to a circuit verification model, or user-created rule system. When such a detection is made, the process proceeds to step 112 wherein the circuit module tests a key using a local authentication algorithm to produce a locally modified key, which is part of locally checked data. Having produced the locally modified key, the circuit module, at step 114, provides the key to an authentication module.

The authentication module, at step 116, modifies the key using a remote authentication algorithm to produce a remotely modified key, which is part of remotely checked data. The remote authentication algorithm sends the remotely modified key and a verification key to the circuit module. Upon receipt of this information, the circuit module compares the locally modified key with the remotely modified key. If a match occurs, the circuit module modifies the verification key using the local authentication algorithm to produce a locally modified verification key, which is also a part of the locally checked data. The locally modified verification key is sent to the authentication module. The authentication module also modified the verification key as part of the remotely checked data.

Having created the remotely checked data, the authentication module compares the modified verification key of the locally checked data with the modified verification key of the remotely checked data at step 118. At step 120, the authentication module determines whether the locally checked data matches the remotely checked data. If a match occurs, the process proceeds to step 124 wherein the authentication module identifies the circuit module as one that has not been modified in an unauthorized manner. If, however, the locally checked data does not match the remotely checked data, the authentication module identifies the particular circuit module as being modified in an unauthorized manner at step 122.

After identifying each of the circuit modules within the rule system, the process proceeds to step 126 wherein the circuit verification model is executed. After completion of the execution of the circuit model, the process proceeds to step 128 wherein time stamp information is tested for changes. The process proceeds to step 130 wherein, when a change is detected, the process identifies that a circuit module has been modified in an unauthorized manner. This information may then be provided to the IC manufacturer, or supplier, which enables the supplier to either verify the change, correct the change, or prevent fabrication of the integrated circuit.

Figure 5:
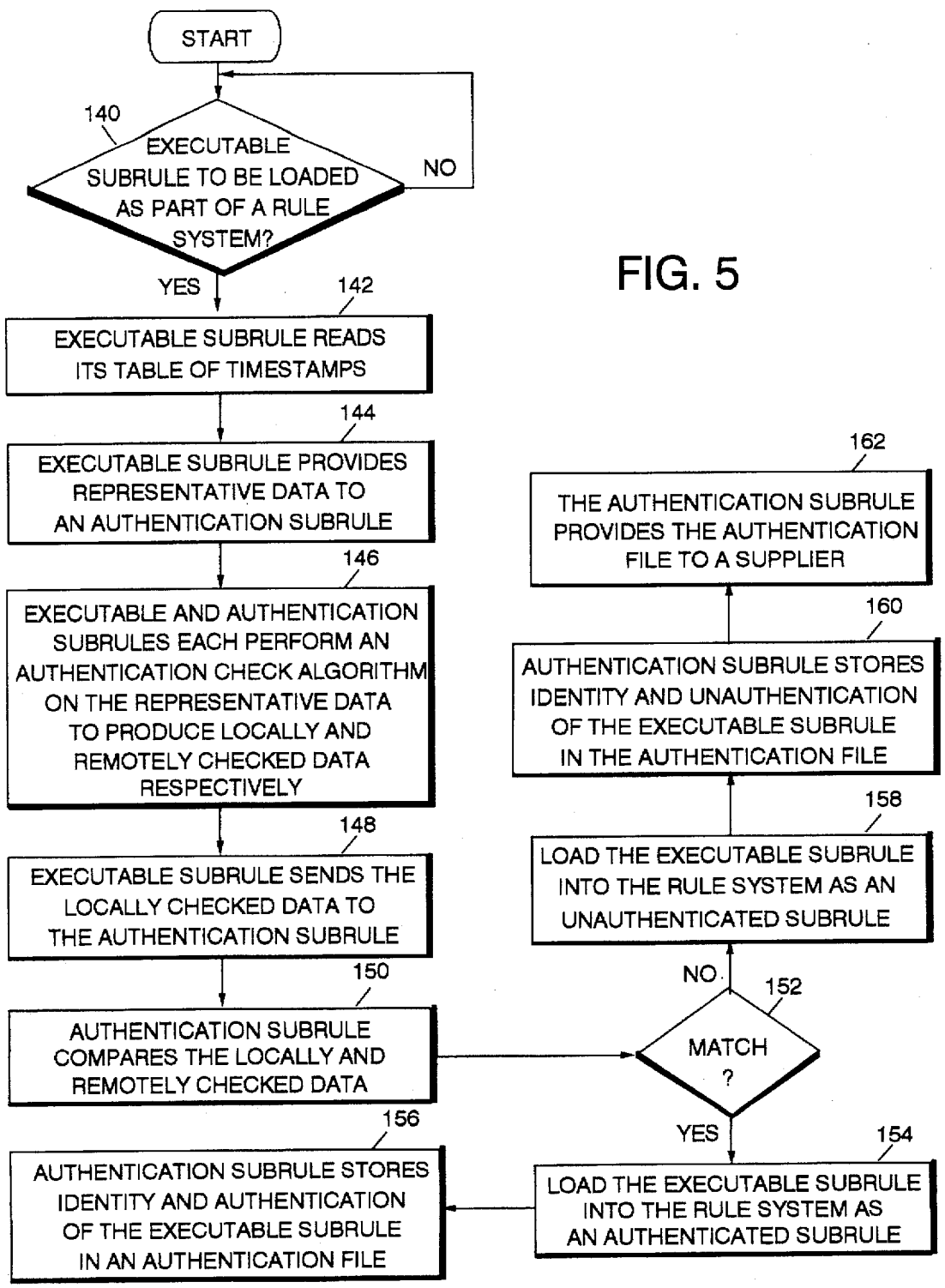
FIG. 5 illustrates a logic diagram that may be used to implement an alternative method of the present invention.

FIG. 5 illustrates a logic diagram that may be used to implement an alternative method in accordance with the present invention. The process begins at step 140 wherein a determination is made as to whether an executable subrule has been selected to be loaded into a rule system. If so, the process proceeds to step 142 wherein the executable subrule reads its table of time stamps. At step 144, the executable subrule provides representative data of at least the table of time stamps to an authentication subrule. At step 146, the executable subrule and the authentication subrule each perform an authentication check algorithm on the representative data to produce locally checked data and remotely checked data, respectively. This authentication check algorithm may be an encryption algorithm, or stored as an encrypted algorithm, thereby further decreasing the likelihood that the IC designer will change the verification process or try to circumvent the verification process.

At step 148, the executable subrule sends the locally checked data to the authentication subrule. The process then proceeds to step 150 wherein the authentication subrule compares the locally checked data with the remotely checked data. At step 152, the authentication subrule determines whether the locally checked data matches the remotely checked data. If the data matches, the process proceeds to step 154 wherein the executable subrule is loaded into the rule system as an authenticated subrule. Having done this, the process proceeds to step 156 wherein the authentication subrule stores identity and authentication of the executable subrule in an authentication file.

If, however, the locally checked data does not match the remotely checked data, the process proceeds to step 158. At step 158, the executable subrule is loaded into the rule system as an unauthenticated subrule. The process then proceeds to step 160 wherein the authentication subrule stores identity and unauthentication of the executable subrule in the authentication file. The process then proceeds to step 162 wherein the authentication subrule provides the authentication file to a supplier. The supplier then may use the authentication file, which indicates which subrules have been modified and which have not, to determine whether to verify the changes made by the IC designer or to prevent fabrication of such integrated circuit designs.

Figure 6:
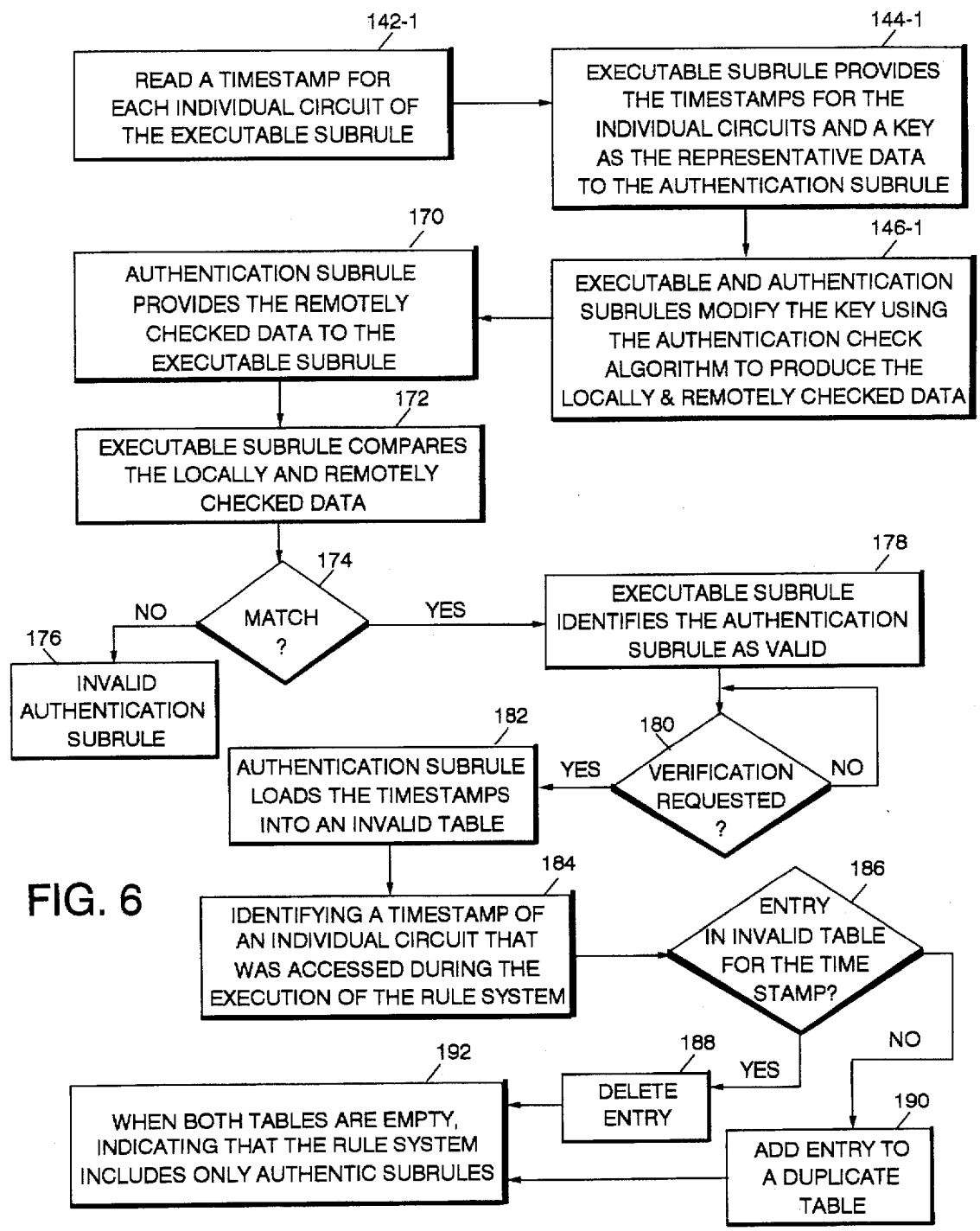
FIG. 6 illustrates logic steps that more fully illustrate several steps of FIG. 5 and introduce additional steps in accordance with the present invention.

FIG. 6 illustrates a logic diagram for implementing a portion of the method of FIG. 5 and additional steps in accordance with the present invention. At step 142-1, the executable subrule reads a time stamp for each individual circuit that is contained within the executable subrule. Next, the process proceeds to step 144-1 wherein the executable subrule provides the time stamps for the individual circuits and a key as the representative data to the authentication subrule. The process then proceeds to step 146-1 wherein the executable and authentication subrules modify the key using the authentication check algorithm to produce the locally and remotely checked data.

The process then proceeds to step 170 wherein the authentication subrule provides remotely checked data to the executable subrule. At step 172, the executable subrule compares the locally checked data with the remotely checked data. The executable subrule, at step 174, determines whether the locally checked data matches the remotely checked data. If not, the process proceeds to step 176 wherein the executable subrule identifies that the authentication subrule is invalid.

If, however, the locally checked data matches the remotely checked data, the process proceeds to step 178 wherein the executable subrule identifies the authentication subrule as valid. Having made this determination, the process proceeds to step 180 where it determines whether a verification request has been made. If so, the process proceeds to step 182 wherein the authentication subrule loads its time stamps into an invalid table. Having done this, the process proceeds to step 184 wherein the authentication subrule identifies a time stamp of an individual circuit that was accessed during the execution of the rule system.

The process then proceeds to step 186 wherein a determination is made as to whether an entry in the invalid table exists for the particular time stamp identified during the execution of the rule system. If so, the process proceeds to step 188 wherein the entry is deleted from the invalid time stamp.

If, however, an entry does not exist in the invalid table for a particular time stamp, either due to one never being entered or it has already being deleted, the process proceeds to step 190 wherein a time stamp is entered into a duplicate table. Once the time stamps identified during execution of the subrule have been exhausted, the process proceeds to step 192 wherein a determination is made as to whether both tables are empty. If both tables are empty, the authentication subrule indicates that the rule system includes only authenticated authentic subrules, i.e., subrules that have not been modified by the IC designer. If, however, either table includes an entry, the authentication subrule indicates that an unauthorized change to one of the circuit modules has been implemented by the IC designer.

As one skilled in the art will readily appreciate, the concepts of the present invention may be used in conjunction with any type of program composed of a plurality of executable subrules. Thus, any user-created program that is generated from a library of executable program cells can be authenticated by using the teachings of the present invention.

The present invention provides a method for verifying the authenticity of an IC design tool. The verification process involves time stamping, by the manufacturer, each circuit module and executable program in the tool kit provided to the IC designer, or designer. If the IC designer modifies a circuit definition, or executable instruction, its corresponding time stamp is changed. When a time stamp in a circuit module does not match a time stamp in the authentication module, an error is flagged and brought to the attention of the supplier. When the supplier is aware of a change to the circuit module, the supplier can verify that the change will indeed work or instruct the IC designer to use the tool kit as designed or terminate the relationship and not fabricate such an IC.

What is claimed is:

1. A method for building and verifying authenticity of a rule system for a custom integrated circuit design, the method comprising the steps of:

a) providing a library of executable subrules, each executable subrule including circuit definitions, a key, time stamp information, and a local authentication algorithm, wherein the time stamp information includes a table of time stamps;

b) providing an authentication subrule, the authentication subrule including a remote authentication algorithm;

c) when an executable subrule is to be loaded as part of the rule system, the executable subrule reads its table of time stamps;

d) providing, by the executable subrule, local representative data to the authentication subrule, the local representative data including the table of time stamps and a key;

e) performing, by the authentication subrule, an authentication check algorithm upon the local representative data to produce remotely checked data, wherein the remotely checked data includes a remotely modified key;

f) providing, by the authentication subrule, remote representative data to the executable subrule, the remote representative data including the remotely modified key and a verification key;

g) performing, by the executable subrule, the authentication check algorithm upon the local representative data to produce locally checked data, wherein the locally checked data includes a locally modified key;

h) comparing, by the executable subrule, the remotely modified key with the locally modified key and (aa) when the remotely modified key matches the locally modified key, modifying the verification key of the remote representative data using the local authentication algorithm of the executable subrule for producing a locally modified verification key and (bb) when the remotely modified key does not match the locally modified key, providing an indication that the executable subrule is not dealing with a valid authentication subrule;

j) sending, by the executable subrule, the locally checked data, including the modified verification key, to the authentication subrule;

k) modifying the verification key of the remote representative data using the remote authentication algorithm of the authentication subrule for producing a remotely modified verification key, wherein the remotely checked data includes the remotely modified verification key;

l) comparing, by the authentication subrule, the remotely checked data with the locally checked data, including comparing the remotely modified verification key with the locally modified verification key; and m) when the locally checked data matches the remotely checked data, loading the executable subrule into the rule system as an authenticated subrule.

2. The method of claim 1 further comprises the step of:
when the executable subrule is loaded into the rule system as the authenticated subrule, storing, by the authentication subrule, identity of the executable subrule as the authenticated subrule in an authentication file.

3. The method of claim 1 further comprises the step of:
when the locally checked data does not match the remotely checked data, loading the executable subrule into the rule system as an unauthenticated subrule.

4. The method of claim 3 further comprises the step of:
when the executable subrule is loaded into the rule system as the unauthenticated subrule, storing, by the authentication subrule, identity of the executable subrule as the unauthenticated subrule in an authentication file.

5. The method of claim 1 further comprises the step of:
providing, by the authentication subrule, an authentication file to a supplier, wherein the authentication file indicates whether each executable subrule of the rule system is an unauthenticated subrule or the authenticated subrule, wherein the unauthenticated subrule indicates that a particular executable subrule has been tampered with which enables the supplier to identify altered executable subrules before fabricating a custom integrated circuit based on the rule system.

6. The method of claim 1, wherein steps (e) and (g) further comprise utilizing an encoded version of the authentication check algorithm to produced the remotely checked data and the locally checked data.

7. The method of claim 1, wherein step (1) further comprises
when an authentication report is requested, loading, by the authentication subrule, the time stamps for each individual circuit of the executable subrule into an invalid table;

deleting, by the authentication subrule, entries in the invalid table when corresponding time stamps are listed during run-time of the rule system;

determining whether the invalid table is empty; and when the invalid table is empty, indicating that the locally checked data matches the remotely checked data.

8. The method of claim 7 further comprises the steps of:

when a particular time stamp does not have an entry in the invalid table, entering, by the authentication subrule, the particular time stamp in a duplicate time stamp table; and when an entry exists in the duplicate time stamp table, indicating that the locally checked data does not match the remotely checked data.

9. A method for building and verifying a rule system of an integrated circuit design selected from a library of executable subrules, the executable subrules each including individual circuits and a table of time stamps, the method comprising the steps of:

a) when an executable subrule is to be loaded as part of the rule system, the executable subrule reading its table of time stamps, wherein the executable subrule further reading a time stamp for each individual circuit of the executable subrule;

b) providing, by the executable subrule, at least representative data of at least the table of time stamps to an authentication subrule, the at least representative data further including the time stamp for each individual circuit and a key;

c) performing, by the authentication subrule, an authentication check algorithm upon the representative data to produce remotely checked data, wherein performing the authentication check algorithm further includes modifying the key by the authentication subrule to produce at least part of the remotely checked data;

d) performing, by the executable subrule, the authentication check algorithm upon the representative data to produce locally checked data, wherein performing the authentication check algorithm further includes modifying the key by the executable subrule to produce at least part of the locally checked data;

$d_1$) providing, by the authentication subrule, the remotely checked data to the executable subrule; comparing, by the executable subrule, the locally checked data and the remotely checked data; and when locally checked data matches the remotely checked data, indicating, by the executable subrule, that the authentication subrule is a valid authentication subrule;

e) sending, by the executable subrule, the locally checked data to the authentication subrule;

f) comparing, by the authentication subrule, the remotely checked data with the locally checked data; and g) when the locally checked data matches the remotely checked data, loading the executable subrule into the rule system as an authenticated subrule, wherein step (f) further comprises when an authentication report is requested, loading, by the authentication subrule, the time stamps for each individual circuit of the executable subrule into an invalid table;

deleting, by the authentication subrule, entries in the invalid table when corresponding time stamps are listed during run-time of the rule system;

determining whether the invalid table is empty; and when the invalid table is empty, indicating that the locally checked data matches the remotely checked data.

10. The method of claim 9 further comprises the steps of:

when a particular time stamp does not have an entry in the invalid table, entering, by the authentication subrule, the particular time stamp in a duplicate time stamp table; and when an entry exists in the duplicate time stamp table, indicating that the locally checked data does not match the remotely checked data.

11. A computer readable storage medium for storing program instructions that, when read by a computer, causes the computer to build and verify authenticity of a rule system for a custom integrated circuit design, the computer readable storage medium comprising:

first storage means for providing a library of executable subrules, each executable subrule including circuit definitions, a key, time stamp information, and a local authentication algorithm, wherein the time stamp information includes a table of time stamps;

second storage means for providing an authentication subrule, the authentication subrule including a remote authentication algorithm;

third storage means for storing program instructions that cause the computer to perform, when an executable subrule is to be loaded as part of the rule system, reading a table of time stamps of the executable subrule;

fourth storage means for storing program instructions that cause the computer to provide local representative data for authentication to the authentication subrule, the local representative data including the table of time stamps and a key;

fifth storage means for storing program instructions that cause the computer to perform, as the authentication subrule, an authentication check algorithm upon the local representative data to produce remotely checked data, wherein the remotely checked data includes a remotely modified key;

sixth storage means for storing program instructions that cause the computer to provide remote representative data for authentication to the executable subrule, the remote representative data including the remotely modified key and a verification key;

seventh storage means for storing program instructions that cause the computer to perform, as the executable subrule, the authentication check algorithm upon the local representative data to produce locally checked data, wherein the locally checked data includes a locally modified key;

eighth storage means for storing program instructions that cause the computer to perform, as the executable subrule, comparing the remotely modified key with the locally modified key and (aa) when the remotely modified key matches the locally modified key, modifying the verification key of the remote representative data using the local authentication algorithm of the executable subrule for producing a locally modified verification key and (bb) when the remotely modified key does not match the locally modified key, providing an indication that the executable subrule is not dealing with a valid authentication subrule;

ninth storage means for storing program instructions that cause the computer to send, as the executable subrule, the locally checked data to the authentication subrule;

tenth storage means for storing program instructions that cause the computer to modify, as the authentication subrule, the verification key of the remote representative data using the remote authentication algorithm for producing a remotely modified verification key, wherein the remotely checked data includes the remotely modified verification key;

eleventh storage means for storing program instructions that cause the computer to compare, as the authentication subrule, the remotely checked data with the locally checked data, including comparing the remotely modified verification key with the locally modified verification key; and twelfth storage means for storing program instructions that cause the computer, when the locally checked data matches the remotely checked data, to load the executable subrule into the rule system as an authenticated subrule.

12.) The computer readable storage medium of claim 11, wherein the twelfth storage means further comprises the function of:

storing program instructions that cause the computer, when the locally checked data does not match the remotely checked data, to load the executable subrule into the rule system as an unauthenticated subrule.

13. The computer readable storage medium of claim 11, further comprising:

thirteenth storage means for storing program instructions that cause the computer to provide, as the authentication subrule, an authentication file to a supplier, wherein the authentication file indicates whether each executable subrule of the rule system is an unauthenticated subrule or the authenticated subrule, wherein the unauthenticated subrule indicates that a particular executable subrule has been tampered with which enables the supplier to identify altered executable subrules before fabricating a custom integrated circuit based on the rule system.

14. A computer readable storage medium for storing program instructions that, when read by a computer, causes the computer to build a rule system for testing a circuit design, the computer readable storage medium comprising:

first storage means for storing program instructions that cause the computer to, when an executable subrule is to be loaded as part of the rule system, read a table of time stamps of the executable subrule;

second storage means for storing program instructions that cause the computer to provide at least representative data of at least the table of time stamps for authentication, further including storing, program instructions that cause the computer to provide, as the executable subrule, the time stamp for each individual circuit and a key as the at least representative data;

third storage means for storing program instructions that cause the computer to perform, as an authentication subrule, an authentication check algorithm upon the representative data to produce remotely checked data, further including storing program instructions that cause the computer to modify the key as the authentication subrule to produce at least part of the remotely checked data;

fourth storage means for storing program instructions that cause the computer to perform, as the executable subrule, the authentication check algorithm upon the representative data to produce locally checked data, further including storing program instructions that cause the computer to modify the key as the executable subrule to produce at least part of the locally checked data;

fifth storage means for storing program instructions that cause the computer to send the locally checked data to the authentication subrule;

sixth storage means for storing program instructions that cause the computer to compare, as the authentication subrule, the remotely checked data with the locally checked data;

seventh storage means for storing program instructions that cause the computer, when the locally checked data matches the remotely checked data, to load the executable subrule into the rule system as an authenticated subrule;

eighth storage means for storing program instructions that cause the computer to provide, as the authentication subrule, the remotely checked data to the executable subrule;

ninth storage means for storing program instructions that cause the computer to compare, as the executable subrule, the locally checked data and the remotely checked data; and tenth storage means for storing program instructions that cause the computer, when the locally checked data matches the remotely checked data, to indicate, as the executable subrule, that the authentication subrule is a valid authentication subrule, wherein the sixth storage means further comprises the functions of:

storing program instructions that cause the computer to load, as the authentication subrule, the time stamps for each individual circuit of the executable subrule into an invalid table;

storing program instructions that cause the computer to delete, as the authentication subrule, an entry in the invalid table when a corresponding time stamp is listed during a run-time of the rule system;

storing program instructions that cause the computer to determine whether the invalid table is empty; and storing program instructions that cause the computer, when the invalid table is empty, to indicate that the locally checked data matches the remotely checked data.

15. The computer readable storage medium of claim 14, wherein the sixth storage means further comprises the functions of:

storing program instructions that cause the computer, when a particular time stamp does not have an entry in the invalid table, to enter, as the authentication subrule, the particular time stamp in a duplicate time stamp table; and storing program instructions that cause the computer, when an entry exists in the duplicate time stamp table, to indicate that the locally checked data does not match the remotely checked data.

* * * * *